United States Patent
Morrison et al.

(10) Patent No.: US 6,560,872 B2
(45) Date of Patent: May 13, 2003

(54) METHOD OF MAKING A CROSS CAR BEAM ASSEMBLY USING A STRUCTURAL ADHESIVE

(75) Inventors: Gerald O. Morrison, Beverly Hills, MI (US); Mark A. Folkert, Farmington Hills, MI (US); Jack S. Palazzolo, Dearborn, MI (US); Ian D. Haynes, Windsor (CA)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/966,432

(22) Filed: Sep. 27, 2001

(65) Prior Publication Data

US 2003/0056872 A1 Mar. 27, 2003

(51) Int. Cl.[7] .............................................. B21D 53/88
(52) U.S. Cl. ...................... 29/897.2; 29/458; 29/525.13
(58) Field of Search ........................ 29/418, 423, 897.2, 29/897.3, 897.312, 897, 525.13, 525.15, 527.2, 458, 428, 469.5, 464, 466; 180/90; 156/307.1, 307.3, 307.7; 296/70, 194, 197; 280/732, 752

(56) References Cited

U.S. PATENT DOCUMENTS

| | | | |
|---|---|---|---|
| 4,953,602 A | * | 9/1990 | Smith |
| 5,234,246 A | | 8/1993 | Henigue et al. |
| 5,311,960 A | * | 5/1994 | Kukainis et al. |
| 5,312,133 A | | 5/1994 | Pietila et al. |
| 5,676,216 A | | 10/1997 | Palma et al. |
| 5,762,395 A | * | 6/1998 | Merrifield et al. |
| 5,823,602 A | * | 10/1998 | Kelman et al. |
| 5,884,904 A | * | 3/1999 | Martini |
| 5,931,520 A | * | 8/1999 | Seksaria et al. |
| 5,934,733 A | * | 8/1999 | Manwaring |
| 5,951,087 A | | 9/1999 | Bittinger et al. |
| 6,073,987 A | * | 6/2000 | Lindberg et al. |
| 6,139,094 A | * | 10/2000 | Teply et al. |
| 6,176,544 B1 | | 1/2001 | Seksaria et al. |
| 6,203,092 B1 | | 3/2001 | Yoshinaka |
| 6,273,495 B1 | * | 8/2001 | Haba et al. |
| 6,308,411 B1 | * | 10/2001 | Wright, Jr. et al. |

FOREIGN PATENT DOCUMENTS

| | | |
|---|---|---|
| DE | 37 17 428 A1 | 12/1987 |
| DE | 19752073 A | 5/1999 |
| EP | 0 240 470 A1 | 10/1987 |

* cited by examiner

Primary Examiner—Gregory M. Vidovich
Assistant Examiner—T. Nguyen
(74) Attorney, Agent, or Firm—Bill C. Panagos

(57) ABSTRACT

A method for manufacturing a cross car beam assembly for use with a vehicle includes joining first and second support brackets to opposite ends of a cross car beam using an adhesive, such that the adhesive is a primary attachment means for joining the support brackets to the cross car beam. Furthermore, the support brackets are attachable to the vehicle so as to support the cross car beam in the vehicle.

3 Claims, 2 Drawing Sheets

METHOD OF MAKING A CROSS CAR BEAM ASSEMBLY USING A STRUCTURAL ADHESIVE

BACKGROUND OF THE INVENTION

1. Field of the Invention

The invention relates to a method for manufacturing a cross car beam assembly for use with a vehicle.

2. Background Art

A cross car beam assembly is a structural member that typically extends between side pillars, which may be referred to as A pillars, of a motor vehicle. A prior method of manufacturing such a cross car beam assembly includes welding together two metal portions to form a beam. The method further includes welding metal support brackets to opposite ends of the beam for attachment to the side pillars.

The equipment required to practice this method, however, is typically expensive to purchase and operate. Furthermore, the welding process causes distortion of the components of the cross car beam assembly. As a result, it may be difficult to achieve proper orientation or alignment of the components.

Other methods of manufacturing cross car beam assemblies are disclosed in U.S. Pat. Nos. 5,234,246 and 5,311,960.

SUMMARY OF THE INVENTION

A method, according to the invention, for manufacturing a cross car beam assembly for use with a vehicle includes joining first and second support brackets to opposite ends of a cross car beam using an adhesive, such that the adhesive is a primary attachment means for joining the support brackets to the cross car beam. Furthermore, the support brackets are attachable to the vehicle so as to support the cross car beam in the vehicle.

Further under the invention, a method for manufacturing a cross car beam assembly for use with a vehicle includes joining together first and second metal cross car beam portions with an adhesive so as to form a cross car beam that is adapted to be attached to the vehicle, wherein the adhesive is a primary attachment means for joining together the cross car beam portions.

DETAILED DESCRIPTION OF THE PREFERRED EMBODIMENT(S)

Figure 1:
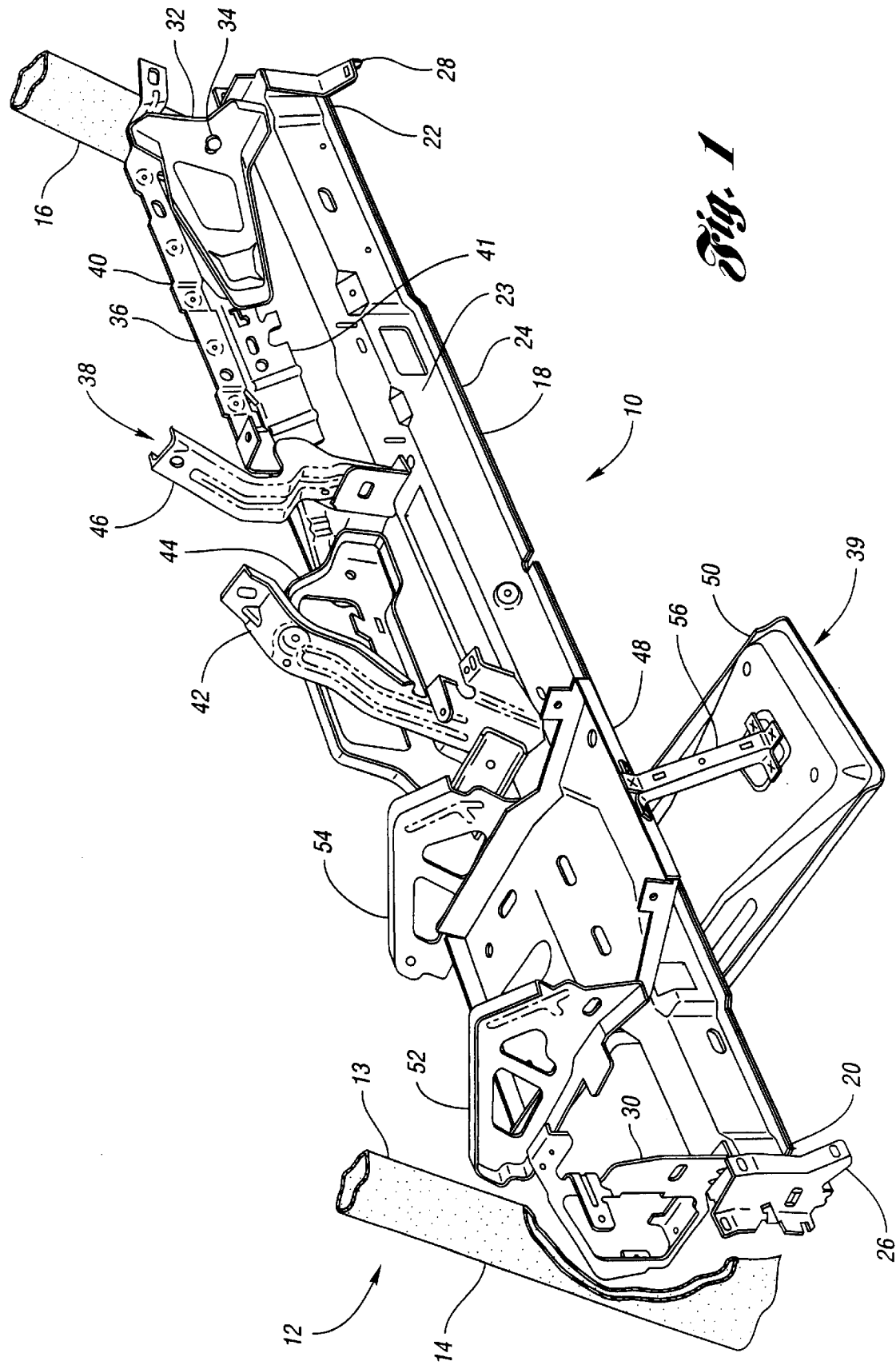
FIG. 1 is a perspective view of a cross car beam assembly according to the invention.

FIG. 1 shows a cross car beam assembly 10 according to the invention for use with a vehicle 12 having a vehicle body 13. The assembly 10 is a structural member that extends between first and second side pillars 14 and 16, respectively, of the vehicle body 13 so as to provide structural support to the vehicle body 13. The assembly 10 may also provide support to various vehicle elements, as explained below in detail.

The assembly 10 includes a structural beam 18 having first and second ends 20 and 22, respectively. Furthermore, the beam 18 may include multiple beam portions, such as first and second beam portions 23 and 24, respectively, that are adhesively attached together. Alternatively, the beam 18 may be a single piece.

The assembly 10 may also include first and second end caps 26 and 28, respectively, adhesively attached to the first and second ends 20 and 22, respectively. The end caps 26 and 28 may be provided, for example, to close off ends 20 and 22 and/or to provide additional support to the beam 18.

The assembly 10 further includes first and second support brackets 30 and 32, respectively, that are adhesively attached to the first and second ends 20 and 22, respectively, of the beam 18. The first and second support brackets 30 and 32, respectively, are attachable to the first and second side pillars 14 and 16, respectively, so as to support the assembly 10 in the vehicle 12. While the support brackets 30 and 32 may be attached to the side pillars 14 and 16 in any suitable manner, in the embodiment shown in FIG. 1, the support brackets 30 and 32 are attached to the side pillars 14 and 16 with fasteners 34.

The assembly 10 may further include one or more additional components, such as glove box frame 36, center support bracket arrangement 38, and steering column support bracket arrangement 39, that are adhesively attached directly or indirectly to the beam 18. The glove box frame 36 supports a glove box (not shown), and includes first and second frame members 40 and 41. Furthermore, the glove box frame 36 is adhesively attached to the second support bracket 32 and the center support arrangement 38.

The center support arrangement 38 includes first, second and third center support brackets 42, 44 and 46, respectively, and is used to support instrument panel elements (not shown), such as a radio, CD player, and/or a climate control system. In the embodiment shown in FIG. 1, the first and third center support brackets 42 and 46, respectively, are adhesively attached to the beam 18, and the second center support bracket 44 is adhesively attached to the first and third center support brackets 42 and 46, respectively.

The steering column support bracket arrangement 39 is used to support a steering column (not shown), and includes first, second, third and fourth steering column support brackets 48, 50, 52 and 54, respectively. The steering column support brackets 48-54 are adhesively attached together, and are also adhesively attached to the beam 18. The steering column support bracket arrangement 40 may also include a brace 56 that is adhesively attached between the first and second steering column support brackets 48 and 50, respectively.

In the embodiment shown in FIG. 1, each of the components 23, 24, 26, 28, 30, 32, 36, 38 and 39 of the assembly 10 is made of steel: Alternatively, each of the components may comprise any suitable material, such as plastic, a composite material, or some type of metal other than steel.

Furthermore, the adhesive used to attach the components together may be any suitable adhesive, such as a two part adhesive that is mixed at the time of application. Examples of such adhesives include DP 420™ and SA 8053™, which are available from 3M Corporation of St. Paul, Minn. According to a feature of the invention, the adhesive is the primary attachment means for joining together the beam portions 23 and 24 of the beam 18 and/or for joining the support brackets 30 and 32 to the beam 18. The adhesive may also be the primary attachment means for joining one or more of the other components 26, 28, 36, 38 and 39 to each other and/or to the beam 18. Additional attachment means, such as fasteners or welds, may be used as secondary attachment means to hold the components 23, 24, 26, 28, 30, 32, 36, 38 and/or 39 together until the adhesive substantially cures.

Figure 2:
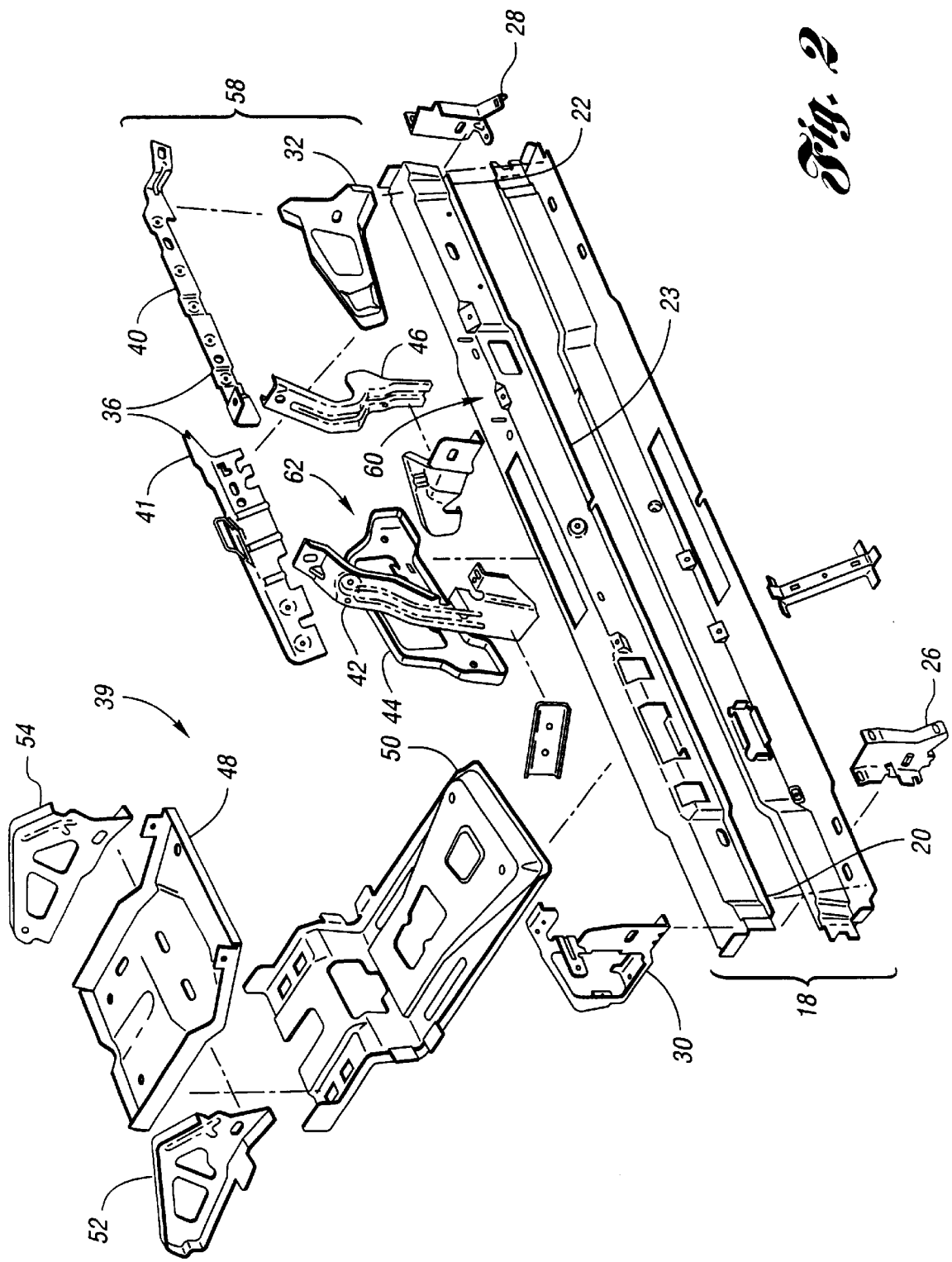
FIG. 2 is an exploded perspective view of the cross car beam assembly.

Referring to FIG. 2, a method according to the invention for manufacturing the assembly 10 will now be described. Generally, the method involves joining two or more components 23, 24, 26, 28, 30, 32, 36, 38 and/or 39 together using adhesive, such that the adhesive is a primary attachment means for joining the components together. A more specific example of the method is described below in detail.

First, one or more beads of adhesive are applied to each end cap 26 and 28 and/or to each end 20 and 22 of first beam portion 23. The end caps 26 and 28 are then positioned on the ends 20 and 22 and are held in place with some sort of secondary attachment means at least until the adhesive substantially cures. For example, the end caps 26 and 28 and the first beam portion 23 may be mechanically connected together at select locations, such as by spot welding and/or clinching together the end caps 26 and 28 and the first beam portion 23. Clinching, as used herein, refers to a process by which parts are forced together in such a manner so as to form an interference fit between the parts. For instance, a suitable clinching process may result in formation of a projection on one part that is engaged with a recess on another part. As another example, the end caps 26 and 28 and the first beam portion 23 may be mechanically connected together with one or more connecting members such as bolts, screws, clamps, or positioning devices. Furthermore, such connecting members may be permanent or temporary. For instance, the connecting members may be part of an assembly jig.

One or more beads of adhesive are then applied to the first support bracket 30 and/or to first end 20 of first beam portion 23. Next, the first support bracket 30 is positioned on the first end 20, and is held in place with a secondary attachment means, such as described above in detail, at least until the adhesive substantially cures.

The second support bracket 32 may then be preassembled to the glove box frame 36 and third center support bracket 46 so as to form a support bracket/glove box frame subassembly 58. The subassembly 58 may be assembled using adhesive and a secondary attachment means, such as described above in detail. Next, one or more beads of adhesive are applied at select locations on top surface 60 of the first beam portion 23 and/or to each of the second support bracket 32 and the third center support bracket 46. The subassembly 58 is then positioned on top surface 60, and is held in place with a secondary attachment means, such as described above in detail, at least until the adhesive substantially cures.

The first center support bracket 42 may then be preassembled to the second center support bracket 44 so as to form a support bracket/instrument panel center frame subassembly 62. The subassembly 62 may be assembled using adhesive and a secondary attachment means, such as described above in detail. Next, one or more beads of adhesive are applied to the subassembly 62, top surface 60 and/or third center support bracket 46. The subassembly 62 is then positioned on top surface 60, and is held in place with a secondary attachment means, such as described above in detail, at least until the adhesive substantially cures.

Next, one or more beads of adhesive may be applied to the first beam portion 23 and/or the second beam portion 24. The second beam portion 24 is then positioned on the first beam portion 23, and is held in place with a secondary attachment means, such as described above in detail, at least until the adhesive substantially cures, so as to form beam 18.

The steering column support bracket arrangement 39 may then be preassembled using adhesive and a secondary attachment means, such as described above in detail. Next, one or more beads of adhesive are applied to each of the first and second steering column support brackets 48 and 50, respectively, and/or to each of the beam portions 23 and 24. The steering column support bracket arrangement 39 is then positioned on the beam 18, and is held in place with a secondary attachment means, such as described above in detail, at least until the adhesive substantially cures.

The entire assembly 10 may then be sufficiently heated by any suitable means so as to sufficiently cure the adhesive. For example, the assembly 10 and jig, if one is used, may be placed in an oven heated to 300 to 400 degrees Fahrenheit for twenty to forty minutes. Such an oven may be any suitable oven, such as a gas, electric or induction oven. Alternatively, if the adhesive does not require heating to cure, the assembly 10 may be allowed to cure at ambient temperature for a suitable amount of time, such as between fifteen and twenty-four hours. More generally, the adhesive may be allowed to cure at a suitable temperature for a suitable amount of time.

After the adhesive has substantially cured, each of the secondary attachment means may be removed from the assembly 10 if the secondary attachment means include temporary, removable connecting members. Alternatively, the secondary attachment means may remain on or part of the assembly 10, although not required to achieve sufficient joint strength. Thus, each secondary attachment means need only have sufficient strength to hold components 23, 24, 26, 28, 30, 32, 36, 38 and/or 39 together until the adhesive has substantially cured.

The assembly 10 produced by the above method includes joints having significant joint strengths. For example, joints including only adhesive may have joint strengths between 5,500 and 6,500 pounds per square inch. Advantageously, joint strength can be easily controlled by varying adhesive mix ratios, application volume and/or area of coverage. In one embodiment of the invention, adhesive is applied along substantially the entire interface between components 23, 24, 26, 28, 30, 32, 36, 38 and/or 39 that are joined together. In addition, the assembly 10 has reduced noise, vibration and harshness ratings compared with conventional cross car beam assemblies.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for manufacturing a cross car beam assembly for use with a vehicle, the method comprising:

applying adhesive to at least one of two metal, cross car beam portions, wherein each cross car beam portion has opposite ends;

clinching together the cross car beam portions so as to form a cross car beam;

applying adhesive to first and second end brackets;

clinching the first end bracket to one end of one cross car beam portion;

clinching the second end bracket to the opposite end of the one cross car beam portion; and heating the cross car beam portions and the end brackets so as to substantially cure the adhesive, thereby adhesively joining together the cross car beam portions, and adhesively joining together the end brackets and the one cross car beam portion;

wherein the adhesive, applied to the at least one cross car beam portion, alone is configured to provide a sufficient joint strength between the cross car beam portions such that the adhesive is a primary attachment means for joining together the cross car beam portions, and wherein the adhesive, applied to the end brackets, alone is configured to provide a sufficient joint strength between each end bracket and the one cross car beam portion such that the adhesive is a primary attachment means for joining together the end brackets and the one cross car beam portion.

2. The method of claim 1 wherein each cross car beam portion extends between the first and second end brackets.

3. The method of claim 1 wherein the first and second cross car beam portions cooperate to form a cross car beam such that the first cross car beam portion forms an upper portion of the cross car beam and the second cross car beam portion forms a lower portion of the cross car beam, wherein each of the upper and lower portions extends between the first and second end brackets.

* * * * *